(12) United States Patent
Mischo

(10) Patent No.: US 7,475,212 B2
(45) Date of Patent: Jan. 6, 2009

(54) METHOD FOR REALLOCATION OF A MEMORY OF A SUBSYSTEM, AND SUBSYSTEM

(75) Inventor: Walter Mischo, München (DE)

(73) Assignee: Infineon Technologies AG, Munich (DE)

( * ) Notice: Subject to any disclaimer, the term of this patent is extended or adjusted under 35 U.S.C. 154(b) by 239 days.

(21) Appl. No.: 11/295,719

(22) Filed: Dec. 7, 2005

(65) Prior Publication Data

US 2006/0156194 A1    Jul. 13, 2006

(30) Foreign Application Priority Data

Dec. 9, 2004    (DE)    ........................ 10 2004 059 392

(51) Int. Cl.
*G06F 12/00* (2006.01)
(52) U.S. Cl. ...................................................... 711/170
(58) Field of Classification Search .................. None
See application file for complete search history.

(56) References Cited

U.S. PATENT DOCUMENTS

| 4,535,455 A | 8/1985 | Peterson |
| 4,939,694 A | 7/1990 | Eaton |
| 5,787,493 A * | 7/1998 | Niijima et al. ............. 711/204 |
| 6,141,771 A | 10/2000 | O'Brien |
| 6,948,112 B2 * | 9/2005 | Hornung et al. ............ 714/766 |
| 7,043,666 B2 * | 5/2006 | Wynn et al. .................... 714/8 |
| 7,228,469 B2 * | 6/2007 | Ito ............................. 714/718 |

FOREIGN PATENT DOCUMENTS

| DE | 19629888 A1 | 7/1997 |
| DE | 19882853 T1 | 6/2001 |
| DE | 10111711 A1 | 9/2002 |
| DE | 10221935 A1 | 12/2003 |

* cited by examiner

*Primary Examiner*—Hiep T Nguyen
(74) *Attorney, Agent, or Firm*—Slater & Matsil, L.L.P.

(57) ABSTRACT

The method for reallocation of a memory, in particular a command memory, wherein the memory is part of a subsystem and the memory is assigned to a processing unit available on the subsystem, and wherein the occurrence of a memory error in the memory (RAM) is detected, whereupon the content of the memory is regenerated, is characterized in that the content of the memory is regenerated by means of an error routine controlled by the processing unit.

18 Claims, 2 Drawing Sheets

SUB1

SUB2

METHOD FOR REALLOCATION OF A MEMORY OF A SUBSYSTEM, AND SUBSYSTEM

CLAIM FOR PRIORITY

This application claims the benefit of prior German Application No. 10 2004 059 392.2, filed in the German language on Dec. 9, 2004, the contents of which are hereby incorporated by reference.

TECHNICAL FIELD OF THE INVENTION

The invention relates to a method for reallocation of a memory or for recovery of a memory content, respectively, which is part of a subsystem, and to the subsystem.

BACKGROUND OF THE INVENTION

With the introduction of so-called "deep sub-micron" processes for the manufacturing of devices with a processing unit such as microprocessors or microcontrollers, their susceptibility to spontaneously occurring memory errors (i.e. errors occurring at a random time during the operation) has been increasing. These memory errors may result in that a processing unit utilizing the memory, e.g. a command memory, executes a wrong command.

The principal source of such errors are collapse events taking place in the vicinity of the chips and emitting ionizing $\alpha$ particles. These errors are not permanent, but may be eliminated completely with a writing on the location concerned. They are therefore generally referred to as "soft errors".

Therefore, protective mechanisms are incorporated with correspondingly manufactured types of devices so as to detect such memory errors. The mechanisms used for the detection of a memory error, e.g. so-called parity encoders, are familiar to a person skilled in the art. Likewise, individual errors can be corrected, e.g. by means of a so-called ECC (ECC="Error Correction Code"). In so doing, it is desirable to regenerate the memory concerned, i.e. to eliminate the error.

So far, a method has been known for regeneration in which an error is reported to a central processing unit that is superordinate to the subsystem. This causes a reset to be generated which results in a resetting of the entire system concerned and thus in a re-initialization of the memory concerned. This method is very time-consuming (frequently in the range of 1 ms) and will, as a rule, interrupt the regular operation of the program to be processed on the device for such a long time that the affiliated system or the superordinate complete system, respectively, can react with substantial malfunctions. These malfunctions may entail substantial damages, e.g. in the case of failure of a device for controlling the engine of a vehicle, in particular at high speed.

SUMMARY OF THE INVENTION

The present invention provides a simpler and quicker recovery of a regular operating state after the detection of a memory error. The present invention also reduces the effect of a memory error on a system affiliated thereto or a superordinate system, respectively.

In one embodiment of the method for reallocation of a memory, the memory is part of a subsystem and is assigned to a processing unit available in the subsystem. Assigned here means that the processing unit accesses the memory in regular operation, i.e. not just during booting up, resetting, or the like. The memory may in particular be a command memory, i.e. a memory with commands that are necessary for the operation of the processing unit, and the processing unit may be a processor core of a microprocessor or a microcontroller. The memory may, additionally or alternatively, also store other data such as program parameters. With the method, the components are adjusted such that the occurrence of a memory error can be detected, e.g. by means of parity encoders, etc. The detecting of the memory error may, for instance, take place by means of an error detection unit that is e.g. integrated in the subsystem.

Once a memory error has been detected, the content of the memory is regenerated, namely, in contrast to the reset, such that this happens by means of an error routine controlled by the processing unit, i.e. "on-board". The processing unit is, for instance, supplied with an error signal and reacts thereon by executing the error routine, e.g. of a program or a part of a program.

By the controlled execution that is restricted to the subsystem, the state of the subsystem is defined at any time. Thus, the superordinate system may remain in regular operation during the reallocation of the memory and, as a rule, only waits for the subsystem; a time-consuming reset of the superordinate system which disturbs the operation can be avoided. The memory error also may be eliminated more quickly and the system may be returned to regular operation in a correspondingly quicker way.

In the case of a comparably unintelligent processing unit or in the case of simple structures it may, for instance, be of advantage if the entire content of the memory is regenerated. The processing unit then only needs a comparatively low intelligence to perform the reallocation, and no identification and addressing of the erroneous data is necessary, either.

For further reduction of the downtime of the subsystem it is, however, advantageous if it is not the entire memory content that is regenerated or recovered, respectively, but only the erroneous part. This is possible if the subsystem is capable of recognizing the address of the erroneous memory word and to process it correspondingly. In this case, the recovery can be restricted to the erroneous word or bit sequence, respectively. If an external additional device is used, a suitable transmission mechanism for the address of the erroneous word must be implemented. Then, it is also favorable if, during the recovery or reallocation, respectively, of the memory of the subsystem, the processing unit of the subsystem does not perform any active process steps, e.g. in that it is deactivated, shut down, or is supplied with no-operating instructions such as NOP commands.

It is advantageous, in particular when only the erroneous data word is regenerated, if the program, after regeneration, continues at the location where the memory error occurred. Thus, the superordinate system only has to wait for the next command and need not perform any resets, which also is time-saving.

It may, however, be of advantage, e.g. in the case of quickly changing external parameters, to restart the program of the processing unit which was stopped by the memory error.

The regeneration of the memory content may, in the simplest case, take place by a shutting down of the subsystem controlled by the processing unit. In so doing, the subsystem—contrary to the reset—no longer gets in an undefined interim state. This solution possibly does not prevent that the subsystem subsequently is no longer in a serviceable state and e.g. has to be rebooted. However, there results the advantage that a gross malfunction can be prevented due to the now defined state, and that thus the behavior of a complete system is improved.

If the subsystem comprises a further processing unit, e.g. a PMU ("Program Memory Unit") or a DMA controller, the executing of the error routine may be performed, instead of by the processing unit assigned to the memory, by the further processing unit, possibly on request of the processing unit assigned to the memory. Since this further processing unit is not assigned to the memory (or vice versa), a data path has be available from the further processing unit to the memory, said data path enabling a direct (e.g. via an additional interface) or an indirect (e.g. via the processing unit assigned to the memory) access to the memory, possibly with arbitration. Whether a further processing unit is available in the subsystem also depends on the arrangement of the complete system. As a rule, the further processing unit will not be the central processing unit, but will only have an effect on part of the complete system.

All in all, an influence of the erroneous data on the processing unit should be avoided. The simplest way as a matter of principle is to use a switch—e.g. a multiplexer—that triggers the desired reaction of the processing unit. This may, for instance, take place in that, on the basis of the memory error detected, the switch supplies the command register of the processing unit with an instruction that leads to the execution of the or of an error routine, instead of supplying it with the next—erroneous—command.

The regeneration or recovery of the memory content may be effected by means of at least one further memory in which the data necessary for regeneration, e.g. all initial data, are available. From this further memory, the data are loaded into the memory assigned to the processing unit. The further memory may comprise a non-volatile memory unit, for instance, a ROM, or a flash memory. Between the non-volatile memory and the processing unit there may also be switched a second further volatile memory, e.g. comprising a SRAM memory unit. Then, a possible operating mode includes the data set of the non-volatile memory or a part thereof is stored in the volatile memory, and the processing unit accesses the volatile memory. The use of the volatile second further memory has the advantage that the commands and data in the volatile memory can be modified in current operation. Volatile and/or non-volatile memories may be part of the subsystem or may be integrated externally in the complete system. In the case of the external arrangement the data may be recalled via an external interface of the subsystem on request thereof, wherein all resources that are typically available on a circuit arrangement may be used, e.g. DMA ("Direct Memory Access") controllers, etc.

If the subsystem comprises as further processing unit a PMU controlling the data traffic from and to the further memory, in particular flash memory, it is particularly favorable if the further processing unit performs the error routine since, in this case, in some designs of the flash memory, this PMU also performs the allocation of the memory after a booting up of the system, i.e. already contains all the resources required for the execution of the error routine.

When implementing and/or performing the error routine, already existing methods for initialization of the complete system or of the subsystem, respectively, are favorably resorted to since an implementing effort without significant additional costs can thus be achieved.

BRIEF DESCRIPTION OF THE DRAWINGS

In the following embodiments, the method and the subsystem are schematically explained in more detail.

DETAILED DESCRIPTION OF THE INVENTION

Figure 1:
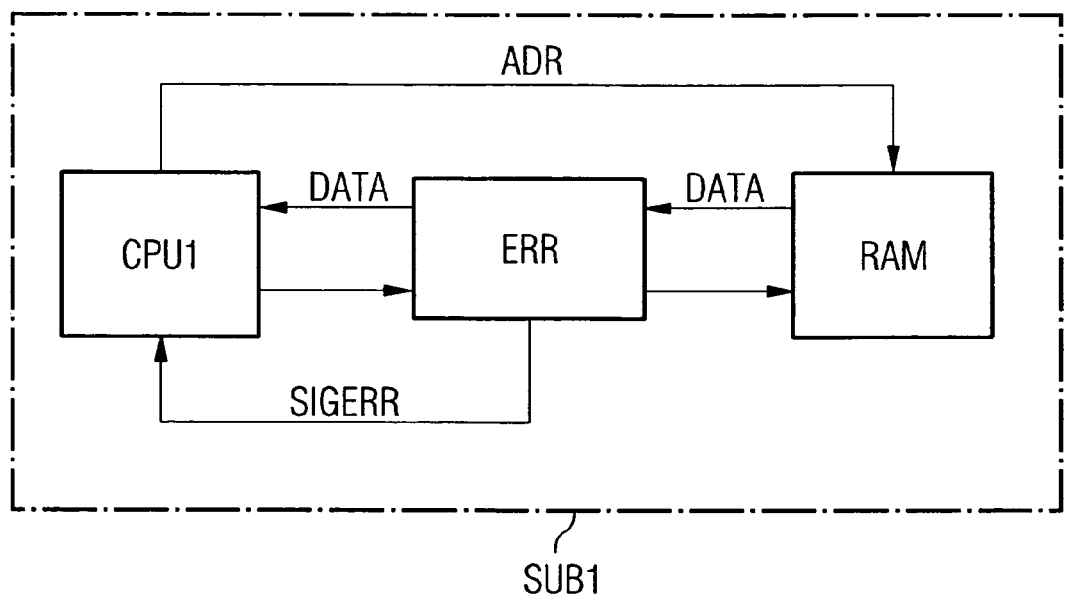
FIG. 1 shows a first embodiment of the subsystem.

FIG. 1 is a sketch representation of a subsystem SUB1 in which the components processing unit CPU1, error detection unit ERR and memory RAM assigned to the processing unit CPU1 are plotted. Further common components, e.g. bus systems etc., have been omitted for the sake of a clear description, but may be supplemented by a person skilled in the art.

The memory RAM here is a command memory—designed as volatile write/read SRAM—of the processing unit CPU1. The processing unit CPU1 receives its data and/or commands from the memory unit RAM (read direction, top data path indicated schematically by arrows directed to the left). In write direction (bottom data path indicated schematically by arrows directed to the right), the memory unit RAM is typically used exceptionally only by the processing unit CPU1, for instance for loading instructions or for storing data.

In read direction, the error detection unit ERR, e.g. a parity encoder, is interposed between the memory unit RAM and the processing unit CPU1. By the error detection unit ERR, a corresponding signal SIGERR is generated which indicates in the regular case that the read data are correct (i.e. that the error signal SIGERR is inactive). On occurrence of a memory error, this is no longer the case, and the error signal SIGERR is activated or output, respectively.

In write direction, the data are also guided via the error detection unit ERR since it then generates the additional data necessary for the error detection, e.g. a parity bit, which are written in the memory unit RAM along with the reference data of the processing unit CPU1. The addresses ADR are, as a rule, irrelevant for error detection and are therefore directly supplied to the memory RAM by the processing unit CPU1.

The processing unit CPU1 may now perform an error routine for the reallocation of the memory, e.g. in that it shuts down the subsystem SUB1 in a controlled manner and has it reboot, or in that data available on an external memory are loaded into the assigned memory RAM by addressing of a further memory that is also external.

In the case of prior art, no reaction of the processing unit CPU1 is provided. Rather, the error signal is directly transmitted to the central processing unit, whereupon a reset is performed.

The subsystem SUB1 may be part of a device, may be designed as independent device, it may comprise a plurality of devices (e.g. in the form of a submodule or of an individual circuit board arrangement or plug-in card), or else be designed as a logic, distributed system.

Figure 2:
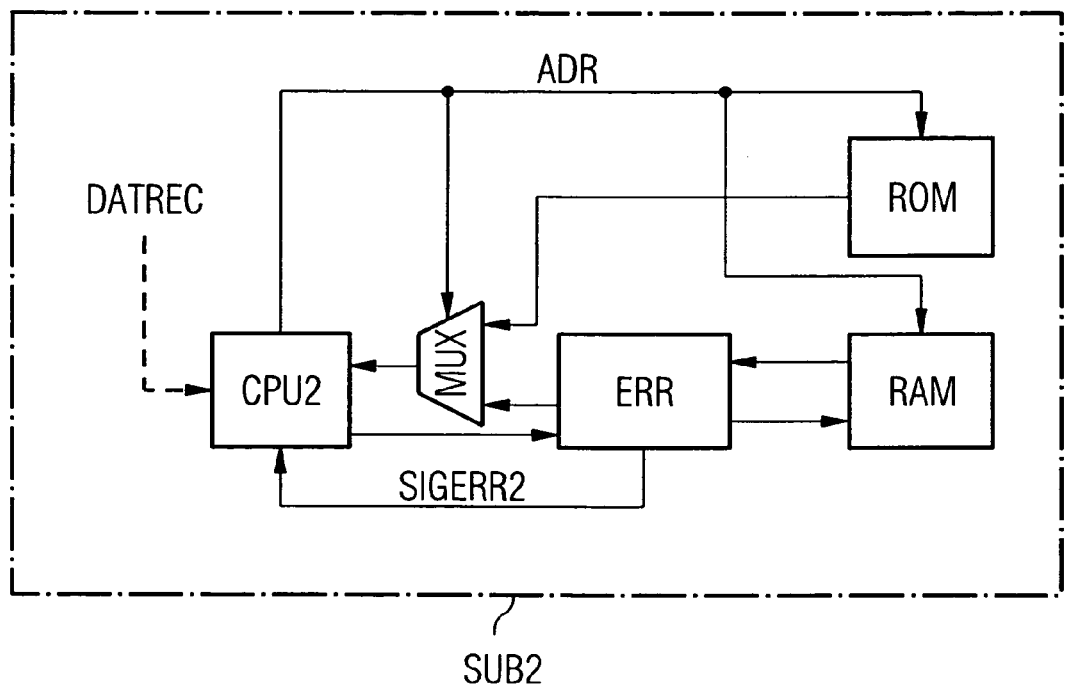
FIGS. 2-4 show further embodiments of the subsystem.

FIG. 2 shows an embodiment of a subsystem SUB2 in which, in addition to the embodiment illustrated in FIG. 1, a non-volatile memory ROM and a switch in the form of a multiplexer MUX are available.

In this embodiment, the subsystem SUB2 may autonomously eliminate an erroneous memory content; the superordinate system only waits for the subsystem SUB2.

On occurrence of a memory error, the memory error detection unit ERR transmits the error signal SIGERR to the processing unit CPU2, namely in the form of a memory pointer to be read into the command register of the processing unit CPU2. The memory pointer points to the non-volatile memory ROM in which the error or recovery routine, respectively, is stored. Thus, the processing unit CPU2 does not process the erroneous command, but the command sequence stored in the non-volatile memory ROM. Also the data required for data generation in the memory RAM may be stored in the non-volatile memory ROM.

In an alternative embodiment, the processing unit CPU2 may obtain the data DATREC required for data recovery from external, as is indicated in this Figure by the dashed arrow.

In so doing, the multiplexer MUX switches the data paths in correspondence with the addressed memory ROM or RAM, respectively. After the data to be recovered—i.e. the entire data available in the RAM or only the data comprising erroneous parts—have been stored in the volatile memory RAM and it has thus been reallocated, a reset of the error signal SIGERR is performed, whereupon the operation is continued with the now correct data string. In particular if only the erroneous word has been replaced, the time for reallocation of the volatile memory RAM is so short that it has no longer any grave influence on the complete system in most of the cases An embodiment in which the memory ROM does not only comprise a non-volatile part, but also a volatile part, wherein the volatile part is designed to be writable, is not illustrated in this Figure, but is contemplated by the invention.

Figure 3:
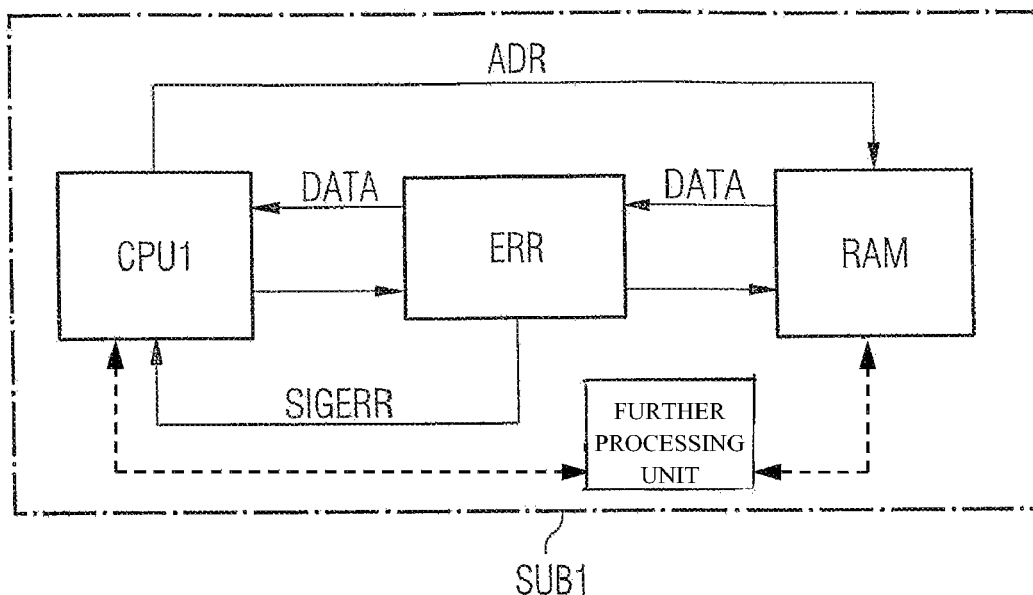
Figure 4:
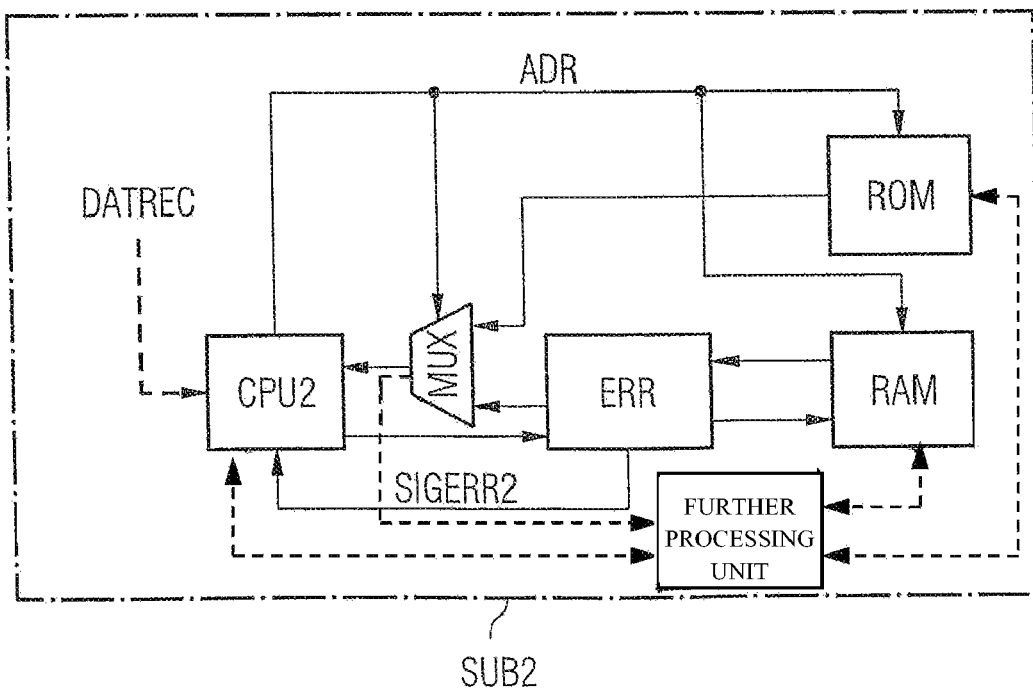

FIGS. 3 and 4 illustrate embodiments in which a subsystem comprises a further processing unit, e.g. a PMU ("Program Memory Unit") or a DMA controller, wherein the executing of the error routine may be performed, instead of by the processing unit assigned to the memory, by the further processing unit, possibly on request of the processing unit assigned to the memory. Since this further processing unit is not assigned to the memory (or vice versa), a data path has be available from the further processing unit to the memory, said data path enabling a direct (e.g. via an additional interface) or an indirect (e.g. via the processing unit assigned to the memory) access to the memory, possibly with arbitration. As a rule, the further processing unit will not be the central processing unit, but will only have an effect on part of the complete system.

If the subsystem comprises as further processing unit a PMU controlling the data traffic from and to the further memory, in particular flash memory, it is particularly favorable if the further processing unit performs the error routine since, in this case, in some designs of the flash memory, this PMU also performs the allocation of the memory after a booting up of the system, i.e., already contains all the resources required for the execution of the error routine.

In a subsystem comprising a command memory, a first processing unit and a further processing unit, a method for reallocation of the command memory comprises assigning the memory to the first processing unit available on the subsystem, wherein the memory is accessible by but not assigned to the further processing unit, detecting an occurrence of a memory error in the memory, and regenerating a content of the memory by an error routine controlled by the further processing unit.

In another embodiment, a subsystem comprises a processing unit, a memory assigned to the processing unit, an error detection unit, a further processing unit, wherein the memory is not assigned to the further processing unit and the memory can be accessed by the further processing unit, wherein the content of the memory is regenerated by an error routine controlled by the further processing unit, and a switch connected with the further processing unit at an output and which is adapted to switch the data words required for executing the error routine by the further processing unit from at least one further memory to the further processing unit.

What is claimed is:

1. A method for reallocation of a command memory, wherein the memory is part of a subsystem, the method comprising:

assigning the memory to a processing unit available in the subsystem;

detecting an occurrence of a memory error in the memory, whereupon content of the memory is regenerated; and resuming a program at a location where the memory error occurred, after the regeneration of the content of the memory, wherein the content of the memory is regenerated by an error routine controlled by a further processing unit in the subsystem, wherein the memory is not assigned to the further processing unit, and wherein the memory can be accessed by the further processing unit.

2. The method according to claim 1, wherein an entire content of the memory is regenerated.

3. The method according to claim 1, wherein an erroneous part of the content of the memory is regenerated.

4. The method according to claim 1, wherein the regeneration of the content of the memory is followed by rebooting a program of the processing unit.

5. The method according to claim 1, wherein execution of the further processing unit-controlled error routine comprises shutting down the subsystem.

6. The method according to claim 5, wherein subsequent to the shutting down the subsystem is rebooted.

7. A subsystem, comprising:

a processing unit;

a memory assigned to the processing unit;

an error detection unit; and a switch connected with the processing unit at an output, and which is adapted to switch data words required for executing an error routine by the processing unit from at least one further memory to the processing unit.

8. The subsystem according to claim 7, wherein the further memory is integrated in the subsystem.

9. The subsystem according to claim 8, wherein the further memory comprises a volatile memory device.

10. The subsystem according to claim 7, further comprising at least one further processing unit, wherein the memory is not assigned to the further processing unit, the memory can be accessed by the further processing unit, wherein the content of the memory is regenerated by the error routine controlled by the further processing unit, and the switch is connected with the further processing unit at an output and is adapted to switch the data words required for executing the error routine by the further processing unit from the at least one further memory to the further processing unit.

11. A subsystem, comprising:

a processing unit;

a memory assigned to the processing unit;

an error detection unit;

a switch connected with a further processing unit at an output and which is adapted to switch the data words required for executing an error routine by the further processing unit from at least one further memory to the further processing unit; and the further processing unit, wherein the memory is not assigned to the further processing unit and the memory can be accessed by the further processing unit, wherein the content of the memory is regenerated by the error routine controlled by the further processing unit.

12. The subsystem according to claim 11, wherein the further memory is integrated in the subsystem.

13. The subsystem according to claim 11, wherein the further memory comprises a volatile memory device.

14. A method for reallocation of a command memory in a subsystem, wherein the subsystem also comprises a first processing unit and a further processing unit, the method comprising:

assigning the memory to the first processing unit available in the subsystem, wherein the memory is accessible by but not assigned to the further processing unit;

detecting an occurrence of a memory error in the memory; and regenerating a content of the memory by an error routine controlled by the further processing unit.

15. The method according to claim 14, wherein an entire content of the memory is regenerated.

16. The method according to claim 14, wherein an erroneous part of the content of the memory is regenerated.

17. The method according to claim 14, wherein the regeneration of the content of the memory is followed by resuming a program at a location where the memory error has occurred.

18. The method according to claim 14, wherein the regeneration of the content of the memory is followed by rebooting a program of the first processing unit.

* * * * *